United States Patent Office 3,583,935
Patented June 8, 1971

3,583,935
THERMOPLASTIC MOULDING COMPOSITIONS OF SATURATED POLYESTERS, EPOXIDES AND WAX
Klaus Weissermel, Kelkheim, Taunus, and Rudolf Kern, Mainz, Germany, assignors to Farbwerke Hoechst Aktiengesellschaft vormals Meister Lucius & Bruning, Frankfurt am Main, Germany
No Drawing. Filed Sept. 26, 1968, Ser. No. 762,980
Claims priority, application Germany, Oct. 19, 1967, P 16 94 208.8
Int. Cl. C08g 15/04, 51/52
U.S. Cl. 260—28
14 Claims

ABSTRACT OF THE DISCLOSURE

The invention provides thermoplastic moulding compositions comprising a linear saturated polyester, an inorganic nucleating agent, a wax and an epoxide, from which compositions injection moulded articles can be produced having a surprisingly high density and ball indentation hardness.

---

The present invention relates to thermoplastic moulding compositions on the basis of saturated polyesters.

It is known to process thermoplastic moulding compositions consisting of linear saturated polyesters of aromatic dicarboxylic acids to give shaped articles.

It has been proposed in Netherlands patent application 6511744 to mix polyethylene terephthalate with finely divided solid inorganic substances as nucleating agents which increase the speed of crystallization of the injection-moulded polyester composition in the mould. In this manner the crystallinity and the density of the shaped articles are increased and thereby the dimensional stability at higher temperatures is improved. As solid inorganic substances there have been proposed, for example, metal oxides, alkaline earth metal salts, talc, glass powder or metals. These inorganic substances should have a particle size of less than 2 microns.

The present invention provides thermoplastic moulding compositions comprising (a) linear saturated polyesters of aromatic dicarboxylic acids and optionally a small quantity of aliphatic dicarboxylic acids with saturated aliphatic or cycloaliphatic diols,
(b) 0.05 to 3% by weight, preferably 0.1 to 0.5% by weight, calculated on the polyester, of inert inorganic solids, for example metal oxides, alkaline earth metal salts or glass powder having a particle size of less than 5 microns,
(c) 0.01 to 2% by weight, preferably 0.05 to 0.3% by weight, calculated on the polyester, of epoxides of the general formula

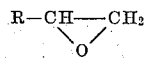

in which R represents an alkyl, cycloalkyl, aralkyl or aryl group optionally containing ether groupings and preferably having 2 to 8 carbon atoms in the alkyl group and containing at least one epoxide group, and optionally
(d) 0.01 to 1% by weight, preferably 0.05 to 0.5% by weight, calculated on the polyester, of a paraffin or hydrocarbon wax, which compositions have excellent properties.

The moulding compositions of the invention have a considerably higher crystallinity and density than known polyester moulding compositions, whereby the utilitarian properties of injection moulded articles made from saturated polyesters are improved.

It is surprising that the addition of the specified epoxide compounds increases the density and the ball indentation hardness of injection moulded articles to an extent hitherto not reached with conventional methods.

Polyethylene terephthalate is preferably used as polyester. There may also be used other polyesters, for example polycyclohexane-1,4-dimethylol terephthalate or polyesters containing as acid component in addition to terephthalic acid up to 5 mol percent of other aromatic or aliphatic dicarboxylic acids, for example isophthalic acid, naphthalene-2,6-dicarboxylic acid, or adipic acid, or as alcoholic component, in addition to ethylene glycol, up to 30 mol percent of other aliphatic diols, for example 2,2-dimethyl-propanediol-1,3 or butanediol-1,4. Alternatively, polyesters of hydroxycarboxylic acids may be used. The polyesters should have a reduced specific viscosity of from 0.6 to 2.0 dl./g., preferably 0.9 to 1.6 dl./g., measured in a 1% solution in a 60:40 mixture of phenol and tetrachloroethane at 25° C. Especially suitable are polyesters having a reduced specific viscosity of from 1.1 to 1.5 dl./g.

Inorganic nucleating agents to be used according to the invention are, above all, alkaline earth metal carbonates, preferably calcium-magnesium carbonate and oxides such as titanium oxide and aluminum oxide.

Suitable epoxides are, for example alkylene-polyol glycidyl ethers such as ethylene glycol diglycidyl ether, butanediol-1,4 diglycidyl ether, hexanediol-1,6 diglycidyl ether, 1,4-dimethylol-cyclohexane diglycidyl ether, 1,1-trimethylolpropane triglycidyl ether, 1-vinylcyclohexene-(3)-diepoxide, hexadiene-1,5-diepoxide, diglycidyl ether of p,p'-dihydroxy-2,2-diphenylpropane.

The inorganic nucleating agent is added to the finished polyester granules or during the manufacture of the polyester prior to or during the polycondensation. It is preferably mixed with the finished polyester, for example by subjecting the granules to rotation together with the nucleating agent. The epoxide is added after termination of the condensation since otherwise it loses its effect. The polyester can be treated in a drum with the nucleating agent and the epoxide or, when the inorganic substance has already been added during condensation, the granules are subsequently mixed with the epoxide. The granules coated with the two additives can be processed directly in suitable injection moulding machines in which a good homogenization is ensured. In most cases it is, however, more advantageous to fuse the mixture in an extruder, to homogenize and then granulate it.

In order to obtain unobjectionable moulded articles the polyester moulding composition should contain as little moisture as possible, preferably not more than 0.01% by weight. To prevent the finished granules from attracting water it is advantageous to coat them with a hydrophobic coating by mixing with a paraffin or hydrocarbon wax.

To achieve as rapid a crystallization in the mould as possible and thus to get along with a short moulding period, the mould must be heated at a temperature of at least 110° C. Moulding temperatures in the range of from 120 to 150° C. are preferred. Moulding temperatures of from 135 to 145° C. proved especially advantageous.

The following examples serve to illustrate the invention but they are not intended to limit it thereto.

EXAMPLE 1

Polyethylene terephthalate granules having a moisture content of 0.01% by weight and a relative specific viscosity of 1.40 dl./g. were subjected to rotation for 1 hour together with 0.2% by weight of calcium-magnesium carbonate and 0.1% by weight of ethylene glycol diglycidyl ether. The coated granules were homogenized in an extruder at a temperature of 275° C., extruded into water in the form of a wire and granulated. The moisture content of the granules was reduced to 0.01% by weight and the granules were coated with a linear paraffin having a flow point of 114 to 118° C.

Sheets of dimensions of 70 x 70 x 4 mm. were injection moulded with the granules at a cylinder temperature of 265° C., a mould temperature of 140° C. and a residence time in the mould of 30 seconds. The sheets had a density of 1.3833 g./cm.³ and ball indentation hardness 10″ of 1580 kp./cm.² measured according to German Industrial Standards DIN 53,456.

EXAMPLE 2

Polyethylene terephthalate granules having a moisture content of 0.01% by weight and a relative specific viscosity of 1.40 dl./g. were subjected to rotation for 1 hour together with 0.2% by weight of calcium-magnesium carbonate and 0.1% by weight of butanediol-1,4-diglycidyl ether. The coated granules were homogenized in an extruder at 275° C., extruded into water in the form of a wire and granulated. The moisture content of the granules was reduced to 0.01% by weight and the granules were coated with a linear paraffin having a flow point of 114 to 118° C. Sheets of dimensions of 70 x 70 x 4 mm. were injection moulded with the granules at a cylinder temperature of 265° C., a temperature of the mould of 140° C. and a residence time in the mould of 30 seconds.

The sheets had a density of 1.3846 g./cm.³ and a ball indentation hardness 10″ of 1570 kp./cm.² measured according to DIN 53,456.

EXAMPLE 3 (comparison)

Polyethylene terephthalate granules having a moisture content of 0.01% by weight and a relative specific viscosity of 1.40 dl./g. were subjected to rotation for 1 hour together with 0.2% by weight of calcium-magnesium carbonate. The coated granules were homogenized in an extruder at a temperature of 275° C., extruded into water in the form of a wire and granulated. The moisture content of the granules was reduced to 0.01% by weight and the granules were coated with a linear paraffin having a flow point of 114 to 118° C.

Sheets of dimensions 70 x 70 x 4 mm. were injection moulded with the granules at a cylinder temperature of 265° C., a temperature of the mould of 140° C. and a residence time in the mould of 30 seconds. The sheets had a density of 1.3716 g./cm.³ and a ball indentation hardness 10″ of 1510 kg./cm.², measured according to DIN 53,456.

EXAMPLE 4 (comparison)

Polyethylene terephthalate granules having a moisture content of 0.01% by weight and a relative specific viscosity of 1.40 dl./g. were subjected to rotation for 1 hour together with 0.3% by weight of calcium-magnesium carbonate. The coated granules were homogenized in an extruder at a temperature of 275° C., extruded into water in the form of a wire and granulated. The moisture content of the granules was reduced to 0.01% by weight and the granules were coated with a linear paraffin having a flow point of 114 to 118° C. Sheets of dimensions 70 x 70 x 4 mm. were injection moulded with the granules at a cylinder temperature of 265° C., a temperature of the mould of 140° C. and a residence time in the mould of 30 seconds. The sheets had a density of 1.3735 g./cm.³ and a ball indentation hardness 10″ of 1480 kp./cm.², measured according to DIN 53,456.

In the following table are summarized the densities and ball indentation hardnesses of the polyester moulding compositions of Examples 1 to 4.

| Example | Composition | Density (g./cm.³) | Ball indentation hardness [1] |
|---|---|---|---|
| 1 | Polyethylene terephthalate plus 0.2% by wt. Ca, Mg(CO₃)₂ plus 0.1% by wt. paraffin plus 0.1% by wt. ethylene glycol diglycidyl ether. | 1.3839 | 1,580 |
| 2 | Polyethylene terephthalate plus 0.2% by wt. Ca, Mg(CO₃)₂ plus 0.1% by wt. paraffin plus 0.1% by wt. butanediol-1,4 diglycidyl ether. | 1.3846 | 1,570 |
| For comparison | | | |
| 3 | Polyethylene terephthalate plus 0.2% by wt. Ca, Mg(CO₃)₂ plus 0.1% by wt. paraffin. | 1.3716 | 1,510 |
| 4 | Polyethylene terephthalate plus 0.3% by wt. Ca, Mg(CO₃)₂ plus 0.1% by wt. paraffin. | 1.3735 | 1,480 |

[1] 10″ kp./cm. DIN 53²,456.

EXAMPLE 5

Polyethylene terephthalate granules having a moisture content of 0.01% by weight and a relative specific viscosity of 1.40 dl./g. were subjected to rotation for 1 hour together with 0.2% by weight to calcium-magnesium carbonate and 0.1% by weight of butanediol-1,4 diglycidyl ether. The coated granules were homogenized in an extruder at a temperature of 275° C., extruded into water in the form of a wire and granulated. The moisture content of the granules was then reduced to 0.01% by weight.

Sheets of dimensions 70 x 70 x 4 mm. were injection moulded with the granules at a cylinder temperature of 265° C., a temperature of the mould of 140° C. and a residence time in the mould of 30 seconds. The sheets had a density of 1.3845 g./cm.³ and a ball indentation hardness 10″ of 1580 kp./cm.², measured according to DIN 53,456.

What is claimed is:

1. Thermoplastic moulding compositions comprising a mixture of
   (a) a linear saturated polyester of aromatic dicarboxylic acids and optionally a small amount of aliphatic dicarboxylic acids with saturated aliphatic or cycloaliphatic diols,
   (b) 0.05 to 3% by weight, calculated on the polyester, of an inert inorganic solid having a particle size of less than 5 microns,
   (c) 0.01 to 2% by weight, calculated on the polyester, of epoxides of the general formula

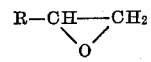

in which R represents an alkyl, cycloalkyl, aralkyl, or aryl group optionally containing ether groupings, and at least containing one epoxide group, and optionally
   (d) 0.01 to 1% by weight, calculated on the polyester, of a paraffin or a hydrocarbon wax.

2. A thermoplastic moulding composition as claimed in claim 1, wherein the polyester is polyethylene glycol terephthalate.

3. A thermoplastic moulding composition as claimed in claim 1, wherein the polyester is polycyclohexane-1,4-dimethylol terephthalate.

4. A thermoplastic moulding composition as claimed in claim 1, wherein the polyester contains, in addition to terephthalic acid units, up to 5 mol percent of units of other dicarboxylic acids.

5. A thermoplastic moulding composition as claimed in claim 1, wherein the polyester contains, in addition to terephthalic acid units, up to 5 mol percent of units of a member selected from the group of isophthalic acid, naphthalene-2,6-dicarboxylic acid, adipic acid and mixtures thereof.

6. A thermoplastic moulding composition as claimed in claim 1, wherein the polyester contains in addition to ethylene glycol units, up to 30 mol percent of units of other aliphatic diols.

7. A thermoplastic moulding composition as claimed in claim 1, wherein the polyester contains, in addition to ethylene glycol units, up to 30 mol percent of units of a member of the group of 2,2-dimethylpropanediol-1,3, butanediol-1,4 and mixtures thereof.

8. A thermoplastic moulding composition as claimed in claim 1, wherein the polyester has a reduced specific viscosity of from 0.6 to 2.0 dl./g., measured in a 1% solution in a 60:40 mixture of phenol and tetrachloroethane at 25° C.

9. A thermoplastic moulding composition as claimed in claim 1, wherein the polyester has reduced specific viscosity of from 0.9 to 1.6 dl./g.

10. A thermoplastic moulding composition as claimed in claim 1, wherein the polyester has a reduced specific viscosity of from 1.1 to 1.5 dl./g.

11. A thermoplastic moulding composition as claimed in claim 1, wherein the inorganic solid is a compound selected from the group of alkaline earth metal carbonates, alkaline earth metal oxides, titanium dioxide, aluminum oxide and mixtures thereof.

12. A thermoplastic moulding composition as claimed in claim 1, wherein the epoxide is a compound selected from the group of ethylene glycol diglycidyl ether, butanediol-1,4 diglycidyl ether, hexanediol-1,6 diglycidyl ether, 1,4-dimethylol-cyclohexane diglycidyl ether, 1,1-trimethylolpropane triglycidyl ether, 1-vinylcyclohexene-3-diepoxide, hexadiene-1,5-diepoxide and the diglycidyl ether of p,p'-dihydroxy-2,2-diphenylpropane.

13. A process for the manufacture of a thermoplastic moulding composition as claimed in claim 1, which comprises adding the epoxide to the polyester after the termination of the polycondensation.

14. Shaped articles made from the thermoplastic moulding composition claimed in claim 1.

References Cited

UNITED STATES PATENTS

| | | | |
|---|---|---|---|
| 2,998,408 | 8/1961 | Zoetbrood | 260—75(Ep)UX |
| 3,372,143 | 3/1968 | Terada et al. | 260—75(Ep)X |
| 3,402,141 | 9/1968 | Matthies et al. | 260—40 |
| 3,479,318 | 11/1969 | Jackson et al. | 260—40 |

FOREIGN PATENTS

| | | | |
|---|---|---|---|
| 954,110 | 4/1964 | Great Britain | 260—835 |

MORRIS LIEBMAN, Primary Examiner

L. T. JACOBS, Assistant Examiner

U.S. Cl. X.R.

260—40